United States Patent Office 3,481,235
Patented Dec. 2, 1969

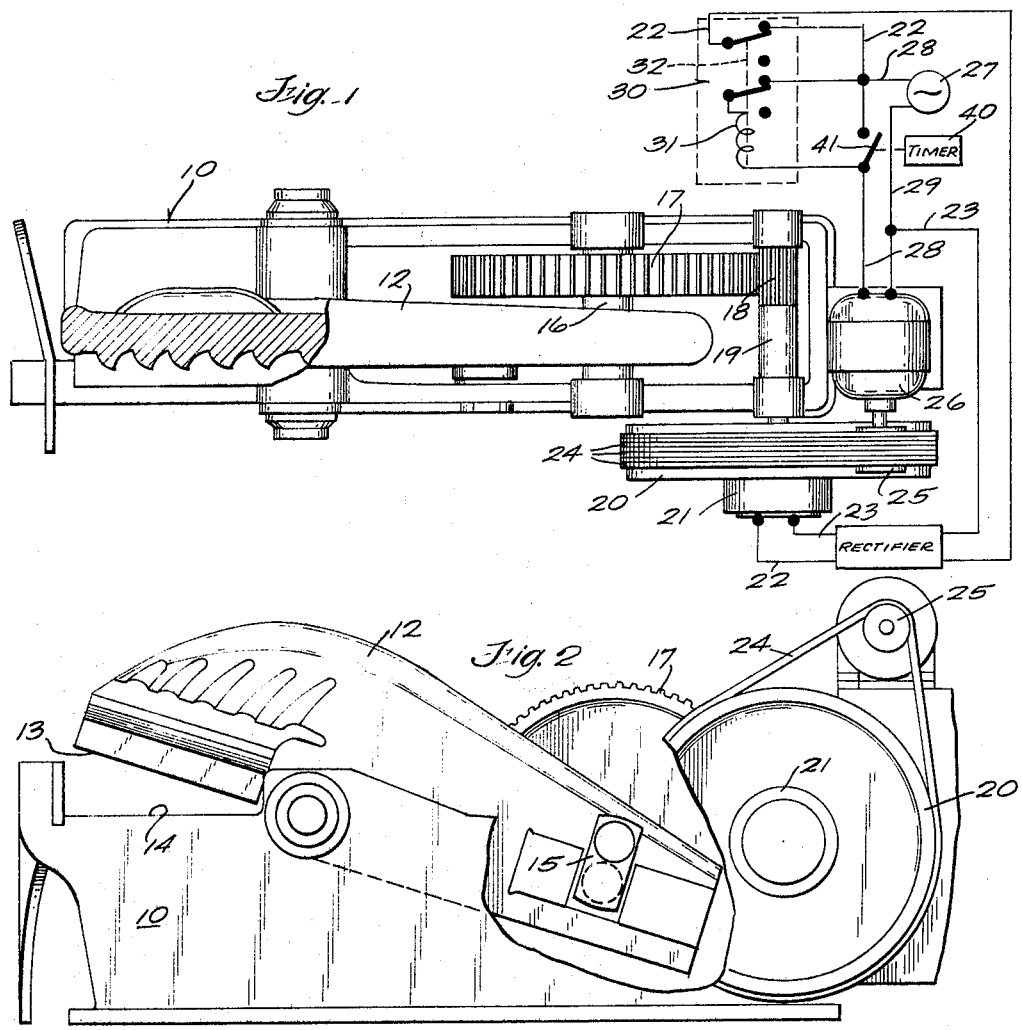
Fig. 1
Fig. 2
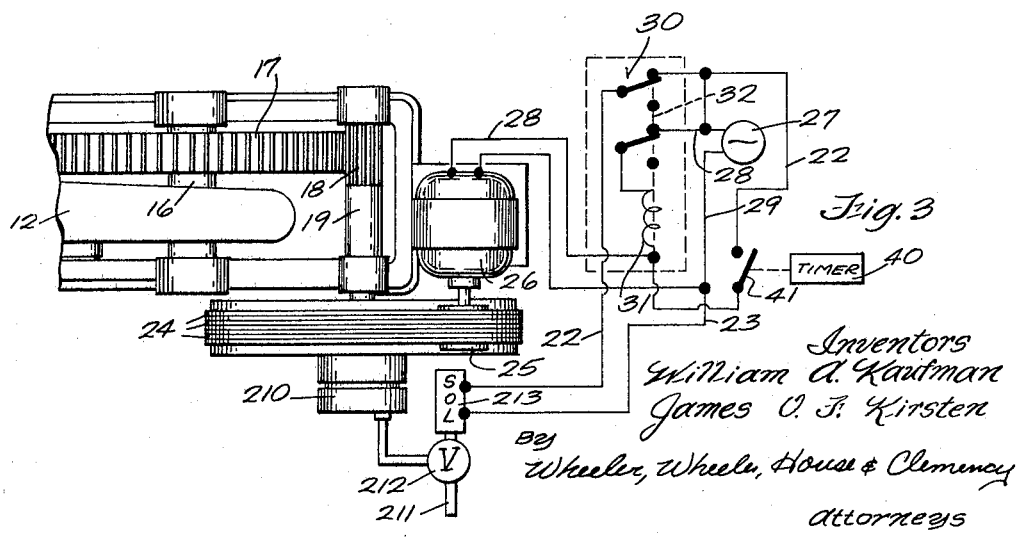
Fig. 3
Inventors
William A. Kaufman
James O. J. Kirsten
By Wheeler, Wheeler, House & Clemency
Attorneys

3,481,235
POSITIVE RELEASE OVERLOAD CLUTCH FOR A SHEAR
William A. Kaufman, Milwaukee, and James O. F. Kirsten, Lannon, Wis., assignors to Doegler & Kirsten, Inc., Milwaukee, Wis., a corporation of Wisconsin
Filed Nov. 8, 1967, Ser. No. 681,424
Int. Cl. B23d 7/24
U.S. Cl. 83—58    10 Claims

ABSTRACT OF THE DISCLOSURE

A shear having a balanced beam is continuously reciprocated by means of a motor driving a flywheel. The shaft of the flywheel drives reduction gearing which in turn drives the shear beam through a crank. The flywheel is connected to the shaft by means of a clutch which may be electrically, pneumatically or otherwise actuated to normally continuously connect the flywheel to the shaft. Overload protection is provided in the form of a current responsive relay having an actuating coil in series with at least one winding of the motor. The relay opens the motor circuit and causes disengagement of the clutch if excessive but non-destructive amperage is drawn by the motor.

BACKGROUND OF THE INVENTION

The shear shown in the attached drawings is basically the shear of Patent No. 3,274,872. It is commonly used in reducing scrap metals to manageable size. When an operator has a piece of metal which is beyond the capacity of the shear to cut, he is tempted to try and cut it anyway, since it is a known fact that this type of shear has a great deal of energy stored in the flywheel and is capable in practice of cutting scrap much larger than its rated capacity, although the life of the parts is shortened thereby. The energy in the flywheel is so great, and the reduction in speed between the flywheel and the balanced beam of the shear is so great, that if a piece of scrap which cannot be cut by the beam is placed under the jaw of the shear, extensive damage is done to the structure of the shear, whether or not the motor overload protective devices are tripped to turn off the motor. Before the shear can again be placed in operation time consuming and expensive repairs are required. These facts have been known for some years, but until this invention no way was known of preventing such damage. It was never sufficient to stop the motor, because of the energy stored in the flywheel.

SUMMARY OF THE INVENTION

This invention solves the above problems by simultaneously shutting off the current to the motor and disengaging the clutch, thus isolating the energy stored in the wheel from the beam of the shear. The balanced construction of the shear beam causes it to come to a halt nearly instantly when the clutch is disengaged under overload conditions, without the application of destructive forces to any part of the machine. The flywheel continues to run and drives the motor through the multiple V-belts which normally drive the flywheel from the motor thus continuing to cool the motor, which is a very desirable feature.

The use of excessive current drawn by the motor as a signal to actuate the overload provisions is old per se. However, it has special relevance in this invention because as the motor slows, the current and the horsepower of the motor rise. Thus a 15 horsepower motor may temporarily produce 60 horsepower, safely, tending to overcome the resistance of the piece being cut within any reasonable limits. If the piece resists being cut under such conditions, the forces produced by the stored energy in the flywheel and the excess horsepower being produced by the motor, all exerted against the shear beam which is held by the resistance of the piece which resists being cut, injure the bearings, or bend or break other parts of the machine such as the crank. Repairs are likely to cost thousands of dollars and take many weeks, during which the machine is out of service. The current is thus a measure of the strain on the machine (except during starting) and is a very effective indicator of whether safe limits are being exceeded.

We have shown two forms of our invention, one in which the actuation of the clutch is electrical and the other in which the action is pneumatic. Both versions are shown somewhat schematically because there are many ways to actuate the system within the limits of our invention. The essentials are a current responsive device connected to respond to the current being drawn by the motor to break the motor circuit and to disengage a clutch when the motor exceeds a pre-determined current at the upper limit of safe operating stresses for the shear. For any motor which exceeds the pre-determined current during starting the invention requires a timer or starting switch of some sort which is adapted to bypass the current responsive safety device during starting of the unit, in order to permit it to achieve normal operating speeds without tripping the safety device.

DRAWINGS

FIGURE 1 is a top view of the invention with a portion of the shear beam broken away and with the electrical circuit shown schematically.

FIGURE 2 is a side elevational view.

FIGURE 3 is a partial top view similar to the right side of FIGURE 1 but showing a modified form of the device.

DESCRIPTION

Our device generally comprises a bed 10 provided with bearings supporting a shear beam 12 having a cutting blade 13 at one end which cooperates with an edge 14 to cut materials. Conventional bearings are provided to oscillatably support beam 12 and a driving crank 15 is located at the end of the beam remote from the cutting blade 13 to oscillate beam 12, causing successive cutting strokes of blade 13. Crank 15 is on a shaft 16 to which is fixed a gear 17 of large size driven from a smaller gear 18 on flywheel shaft 19, all of said shafts being supported on conventional bearings from bed 10. Flywheel 20 is freely rotatably supported on shaft 19, and is operatively connected to the shaft by a clutch 21, which in the embodiment shown in FIGURE 1 is electrically actuated. When current is supplied through wires 22 and 23 shaft 19 is coupled to flywheel 20. If the current is cut off for any reason the clutch ceases to operate and flywheel 20 runs free upon shaft 19. A conventional clutch may be used, as for instance a disc clutch in which a coil supplies a magnetic field to cause the disc or discs fixed to shaft 19 to rotate with the disc or discs fixed to flywheel 20. The absence of a field permits relative rotation to occur freely.

Flywheel 20 is driven by belts 24 which in turn are driven by a small diameter multiple pulley 25 on the shaft of motor 26.

Motor 26 may be any of several common types, including three phase motors, but solely for ease of illustration the motor is shown as a single phase 110 volt type. The control systems illustrated in FIGURES 1 and 3 are schematic and are illustrative of the principles of the invention. They do not contain all the elements which might be used, such as low voltage relays controlling high voltage relays, but the application of the invention to such systems will be clear from this description. Many other circuits are possible for the control system, and a conventional motor starting circuit will always be added in normal practice, but such motor starting circuits form no part of the instant invention and are not described here.

As shown in FIG. 1, two wires 28 and 29 connect a source of current 27 with motor 26. A relay, designated generally as 30, has a relay coil 31 in series with the motor 26, the coil having appropriate electrical characteristics so that it will not actuate the armature shown schematically as dotted line 32 unless the current being drawn by motor 26 from the source of current 27 exceeds a predetermined value within the safe operating range of both the shear and motor. In practice, motor 26 may be a three phase 15 horsepower motor with relay coil 31 in series with at least one winding, the electrical characteristics of coil 31 being so chosen that armature 32 will pull in if the entire motor draws sufficient amperage. In such a motor, on a shear as described, it has been found effective to permit enough current to temporarily operate the motor at 60 to 65 horsepower, but to adjust coil 31 to actuate the relay if more current than that is drawn. Also in practice a relay may be used in which the current required to pull in the relay armature 32 is adjustable. The relay may then be adjusted to the particular shear by adjusting the relay for actuation when a piece just slightly larger than the rated capacity of the shear is cut.

As shown, relay 30 is a type having two normally closed circuits in the contact section which are open when armature 32 is actuated. One of the circuits completes the section from electric line 28 through the relay coil 31 and motor 26 to electric line 29. The other circuit in relay 30 normally closes a circuit from electric line 28 through electric line 22 to electric clutch 21 and returning through electric line 23 to electric line 29 and back to the source of current 27. Thus when the relay armature 32 is actuated by excessive amperage being drawn through motor 26 and relay coil 31 it breaks the circuit to the clutch as well as to the motor.

Timer 40 is provided with a switch 41 connected in parallel with relay coil 31, and is of a type which may be closed for a predetermined period of time, after which switch 41 opens. It is used in starting motor 26. When a motor runs at slow speed it draws very high amperage, and this is true when the motor is starting as well as when it is slowed down by an overload. Thus, timer 40, a manual switch, or some other means is necessary to bypass relay 30 during starting so that an excessive starting current may be drawn briefly without breaking the motor circuit and the clutch circuit.

Relay 30 is of a type which remains in its actuated position once coil 31 has actuated armature 32. With the current to motor 26 and clutch 21 safely interrupted, the operator may back the shear away from the piece which has stalled the shear, and remove it, after which relay 30 may be reset to close the motor and clutch circuits. The circuit shown is greatly simplified for illustration of the manner of operation. Many equivalent circuits will operate in the same manner, and are contemplated within the scope of this invention.

As shown in FIG. 3, the invention includes modifications of the clutch structure as well. That figure shows a pneumatically energized clutch 210 which receives air pressure from a source (not shown) through supply passage 211 when valve 212 is energized by solenoid 213. The solenoid is controlled by the circuits shown in FIG. 1, or their equivalents, and the same reference characters are used. As long as solenoid 213 receives current, valve 212 supplies pressure to clutch 210 and flywheel 20 is secured to shaft 9. Upon actuation of relay 30, current to solenoid 213 is cut off and valve 212 is permitted to return to its rest position in which supply passage 211 is closed and clutch 210 is vented to the atmosphere, disengaging the clutch and permitting flywheel 20 to rotate freely on shaft 19.

It will be noted that any current failure will immediately disable the clutch, but that flywheel 20 will continue to drive the motor for a time, dissipating its heat and aiding in re-starting if current is restored while the flywheel is turning.

We claim:
1. In a shear, a movable cutter, mechanical means which cyclically moves the cutter to and from cutting position, a flywheel shaft drivingly connected to said mechanical means, a flywheel on said shaft, a motor drivingly connected to said flywheel, and a power source for said motor, the improvement comprising a clutch adapted to connect said flywheel to said shaft, and overload responsive means adapted to simultaneously disconnect said motor from its power source and disengage said clutch, the clutch being normally disengaged, said overload responsive means comprising means to energize said clutch in the absence of an overload, thereby engaging said clutch only when no overload is present.

2. The device of claim 1 further comprising timing means to energize and engage said clutch for a limited period regardless of whether an overload is present, whereby to permit motor starting.

3. In a shear, a movable cutter, mechanical means which cyclically moves the cutter to and from cutting position, a flywheel shaft drivingly connected to said mechanical means, a flywheel on said shaft, a motor drivingly connected to said flywheel, and a power source for said motor, the improvement comprising a clutch adapted to connect said flywheel to said shaft, and overload responsive means adapted to simultaneously disconnect said motor from its power source and disengage said clutch, said source of power being a source of electric power, and said motor and said clutch being electric, means connecting said motor and said clutch to said source of electric power, said overload responsive means including means responsive to excessive current to disable said means connecting said motor and said clutch to said source.

4. In a shear, a movable cutter, mechanical means which cyclically moves the cutter to and from cutting position, a flywheel shaft drivingly connected to said mechanical means, a flywheel on said shaft, a motor drivingly connected to said flywheel, and a power source for said motor, the improvement comprising a clutch adapted to connect said flywheel to said shaft, and overload responsive means adapted to simultaneously disconnect said motor from its power source and disengage said clutch, said source of power for said motor being electric, said clutch being energized pneumatically, and said overload responsive device including means responsive to excessive current in said motor to disconnect said motor from said source of electric power and disengage said clutch.

5. In a shear, a movable cutter, mechanical means which cyclically moves the cutter to and from cutting position, a flywheel shaft drivingly connected to said mechanical means, a flywheel on said shaft, a motor drivingly connected to said flywheel, and a power source for said motor, the improvement comprising a clutch adapted to connect said flywheel to said shaft, and overload responsive means adapted to simultaneously disconnect said motor from its power source and disengage said clutch, said clutch being normally disengaged, and clutch engaging means adapted to maintain said clutch in engagement only when said overload responsive means is inactive.

6. In a shear, a movable cutter, mechanical means which cyclically moves the cutter to and from cutting position, a flywheel shaft drivingly connected to said mechanical means, a flywheel on said shaft, a motor drivingly connected to said flywheel, and a power source for said motor, the improvement comprising a clutch adapted to connect said flywheel to said shaft, and overload responsive means adapted to simultaneously disconnect said motor from its power source and disengage said clutch, said shear comprising a beam oscillatable on a central pivot, said cutter being at one end of said beam and said mechanical means which cyclically moves the cutter comprising a crank at the other end of said beam, said motor and power source being electric and said overload responsive means comprising a relay having an actuating coil in series with at least one winding of said motor.

7. The device of claim 6 in which said relay includes means to interrupt the power to said motor upon actuation and means to interrupt the power to said clutch upon actuation, said clutch being normally disengaged.

8. The device of claim 7 in which the clutch is engaged by supplying electric power thereto.

9. The device of claim 7 in which the clutch is engaged by supplying pneumatic pressure thereto.

10. The device of claim 7 further comprising a timer having a normally open switch in parallel with the relay coil, said timer being effective to close said switch for a predetermined time during motor starting.

References Cited

UNITED STATES PATENTS

| | | | |
|---|---|---|---|
| 1,600,256 | 9/1926 | Stoll | 83—58 X |
| 1,909,156 | 5/1933 | Williams et al. | 83—58 X |
| 3,078,750 | 2/1963 | Haywood et al. | 83—58 |
| 3,274,872 | 9/1966 | Kirsten | 83—602 X |

OTHER REFERENCES

"Rock Products," vol. 64, No. 1, p. 79, January 1961.

WILLIAM S. LAWSON, Primary Examiner

U.S. Cl. X.R.

83—543, 602; 241—32